Nov. 19, 1940.   W. S. TORRENCE   2,221,852
FISHING REEL
Filed Sept. 16, 1938
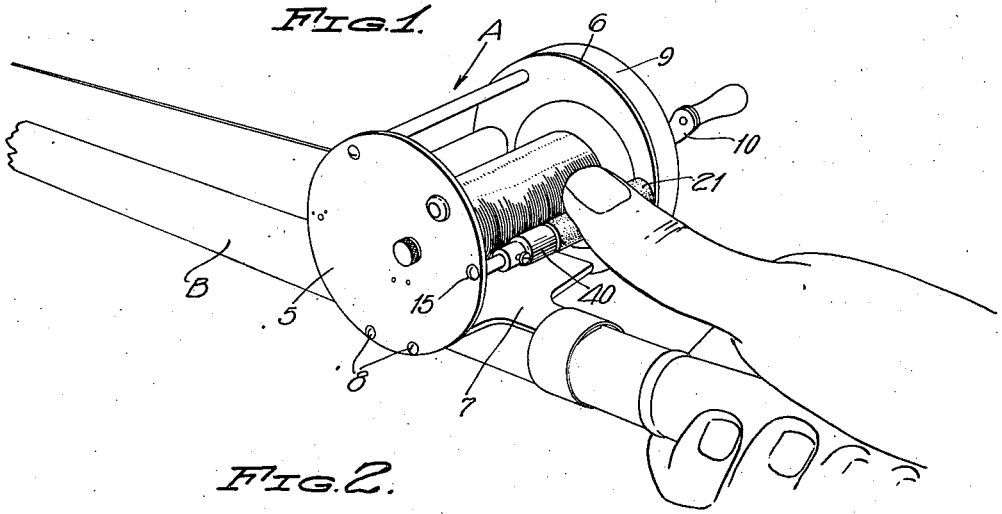
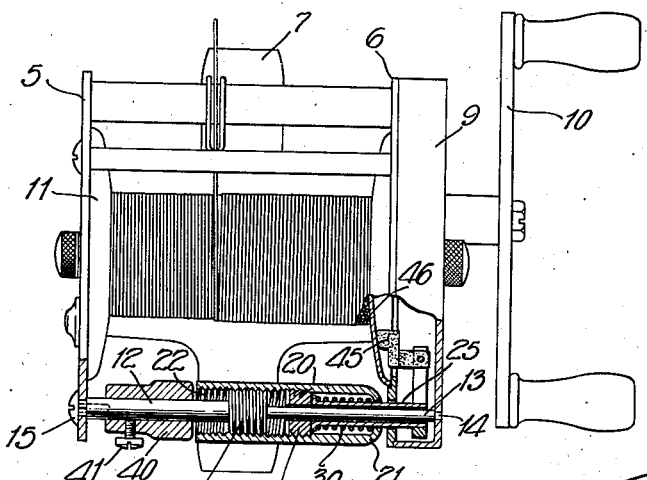
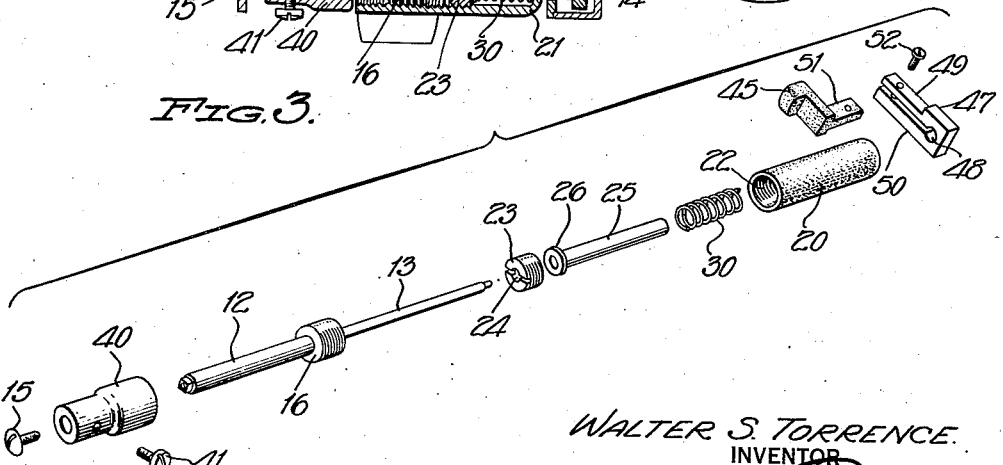
WALTER S. TORRENCE
INVENTOR Patented Nov. 19, 1940

2,221,852

UNITED STATES PATENT OFFICE 2,221,852

FISHING REEL

Walter S. Torrence, New York, N. Y.

Application September 16, 1938, Serial No. 230,176

6 Claims. (Cl. 242—84.5)

This invention relates to new and useful improvements in fishing reels and it is the object of the invention to improve the construction and mode of operation of such reels.

In bait casting, the rod is given a whip which projects the bait, the weight of the bait upon the line operating to revolve the spool of the reel in a forward direction to pay the line therefrom.

As the bait is cast, the initial force imparted to the spool of the reel is relatively greater than at any other time and unless the spool is controlled in its revolving action, it often pays off the line at a greater rate than can be compensated for, or taken up by the bait in its travel through the air thereby producing slack in the line which is rewound upon the spool while it is still turning in the forward or paying out direction, and further paying out of the line is prevented by reason of its becoming snarled as the result of its being wound in two directions upon the reel, this condition being commonly termed among bait casters as a "backlash."

Among the more expert in the use of fishing rods and reels in bait casting, the "backlash" is prevented by the exertion of a proper amount of pressure applied to the spool of the reel by the thumb of the caster, commonly called, "thumbing" the reel, but unless one is expert, the results obtained are not generally satisfactory.

It is the object of the present invention to provide a new and improved fishing reel in which the casting of a bait may be accomplished even by the most inexperienced without danger of a "backlash."

A feature of the invention resides in the provision of novel means for controlling the revolving speed of a fishing reel spool in the line paying out direction without detracting from the distance of the cast or the accuracy with which the cast may be performed.

A further feature of the invention resides in a novel control means for the spool of a fishing reel which may be thrown at will, into and out of operative relation with the spool of a fishing reel.

A further feature of the invention resides in a novel construction whereby the degree of control of the spool of the reel may be varied in order to compensate for variations in the weights of the different baits used.

Still another feature of the invention resides in a novel construction and arrangement of parts whereby, once the spool controlling means is adjusted to a bait of a given weight, the control means may be thrown into and out of operation with the reel spool without effecting or changing the adjustment thereof.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawing illustrating the invention in its preferred form and the following detailed description of the constructions therein shown.

In the drawing:

Figure 1 is a fragmentary perspective view illustrating the butt of a fishing rod with a reel constructed in accordance with the present invention mounted thereon, the view also illustrating the manner in which the reel is manipulated, Figure 2 is a view in top plan and partly in horizontal section, the view being on an enlarged scale, and;

Figure 3 is a distended perspective view of the operating parts of the reel.

Referring to the drawing by reference character, the reel is designated A and as is illustrated in Figure 1, the reel is of the type to be mounted upon a rod B.

The reel consists of two end members 5 and 6 rigidly carried by a base member 7 and retained in spaced relation by a plurality of posts which bridge the space between the end members and which may be connected thereto by screws or the like 8 in the ordinary manner.

The reference character 9 designates a housing which is removably carried by the end member 6, and this housing encloses, in the ordinary manner, the gearing not shown which is operated by the crank or handle 10 to drive the spool 11 of the reel in a conventional manner.

In the present instance, the spool 11 is so mounted in the reel that it may freely revolve in the direction to pay the line therefrom, the spool being rotated in the opposite direction to wind the line thereon by the crank or handle 10 through a suitable train of gearing not shown.

As best illustrated in Figure 2 of the drawing, one of the posts which connect the end members 5 and 6, is of special construction and this post will now be described.

The specially constructed post has two diameters, the larger diameter being designated 12, the smaller diameter being designated 13. The section of smaller diameter has a reduced extension 14 receivable in an opening in the housing 9, the section of larger diameter being provided with a threaded recess for the reception of a screw 15 by which the post is secured in position between the end members 5 and 6.

Intermediate of its ends, this post has an enlarged threaded section 16, the purpose of which will be hereinafter described. Threaded upon the section 16, there is a sleeve 20 which has a contracted end portion 21. The interior of the sleeve 20 is threaded as at 22 and having engagement with this thread 22, there is a nut 23, which is provided with a passage 24 through which the section 13 of the post passes.

The reference character 25 designates a flanged sleeve, the flange thereof being designated 26 and this sleeve slides upon the section 13 of the post, the sleeve 25 extending through the contracted end 21 of the sleeve 20.

The flange 26 of the sleeve 25 is adapted to engage the nut 23 and interposed between the flange 26 of the sleeve 25 and the contracted end 21 of the sleeve 20, there is a coil spring 30 which also surrounds the sleeve 25.

By this construction and arrangement of parts, it is apparent that the tension of the spring 30 is exerted against the contracted end of the sleeve 20 and also against the flange 26 of the sleeve 25.

In assembling the mechanism, the spring 30 is passed over the sleeve 25, and both are inserted into the open end of the sleeve 20 to position where the sleeve 25 extends or projects through the contracted end 21 of the sleeve 20. The nut 23 is next threaded into the sleeve 20 to the position shown to place the spring 30 under compression between the contracted end 21 of the sleeve 20, and the flange 26 of the sleeve 25. The sleeve 20 is next threaded upon the threaded portion 16 of the post with the section 13 of the post passing through the sleeve 25.

The sleeve 20 is movable along the post by engagement of the threads 22 thereof with the threads of the threaded member as the sleeve 20 is rotated and means is provided to limit this movement in one direction, as to the left in Figure 2 of the drawing. The limiting means is herein illustrated as a stop 40 movable along the section 12 of the post and which may be held in adjusted position by a set screw 41.

After the parts have been assembled as heretofore described, the stop 40 is positioned upon the post and the post is placed between the end members 5 and 6 and secured in position by the screw or bolt 15.

The reference character 45 designates a friction element adapted for engagement with one end member 46 of the reel spool. This friction element may be of felt, leather or other suitable material and it is mounted upon and carried by the sleeve 25 by which it is moved into and out of engagement with the spool as the sleeve 25 slides upon the post.

For securing the friction element 45 to the sleeve 25, I may employ a split arm member 47 having an opening 48 to receive the end of the sleeve 25 and two arms 49 and 50 between which is received an extension 51 of the friction element 45. A screw 52 passes through the arm 49 and has threaded engagement with the arm 50 to clamp the arm 47 upon the sleeve 25 and also to clamp the extension 51 of the friction element between the arms 49 and 50 of the arm 47.

The friction element 45 and the arm 47 may be assembled after the post has been positioned between the two end members 5 and 6, it being understood that the housing 9 is removable independently of the end member 6 as is the common construction.

The several parts are illustrated in their assembled relation in Figure 2, of the drawing and reference will now be had to said figure in describing the manner in which the mechanism operates to prevent overwinding of the reel spool and the so-called "backlash" resulting therefrom.

For the sake of illustration we will assume that the parts as assembled in Figure 2, are adjusted for the proper casting of a bait which weighs two ounces. With the parts in the position shown, when the rod is whipped the spool will be free to run in the forward direction to pay the line therefrom. It will be noted that the friction element 45 is in engagement with the end 46 of the spool which retards the rotating speed of the spool, holding it to a speed commensurate with the speed of travel of the bait through the air.

After the cast has been completed, the sleeve 20 is engaged by the thumb of the caster as shown in Figure 1, and the sleeve is rotated rearwardly or in a clockwise direction in Figure 1. The threads 16 and 22 are such that this rearward rotation of the sleeve moves the same to the right in Figure 2, moving the sleeve 25 to the right by reason of its engagement with the nut 23, and thereby disengaging the friction element 45 with relation to the end plate 46 of the reel spool, leaving the spool free to operate by the crank or handle 10 to wind the line thereon.

When the bait has been retrieved, but before the next cast is made, the sleeve 20 is again engaged by the thumb and rotated in the forward or counter-clockwise direction. Rotation of the sleeve 20 in the counter-clockwise direction moves the sleeve to the left in Figure 2 to a position where it engages the stop 40. Movement of the sleeve 20 to the left as above described, permits movement of the sleeve 25 to the left also under the influence of the spring 30, and causes the friction element 45 to again engage the spool end 46 to exert a retarding action on the spool when it is rotating forwardly to pay the line therefrom.

The extent or degree of friction exerted upon the spool by the friction element is determined by the extent of movement to the left in Figure 2, and the extent of this latter movement is in turn determined by the position of the stop 40 which in turn limits the movement to the left of the sleeve 20.

Assuming now that the two ounce bait is removed and a three ounce bait used in its place. The force imparted to the spool under the influence of the casting of the three ounce bait will, of course, be greater than in the case of the two ounce bait and the spool will necessarily have to be retarded to a greater extent to prevent over winding and the resultant "backlash."

To adjust the reel to use with the heavier bait, the stop 40 is moved slightly to the left in Figure 2, thus permitting further movement to the left of the sleeve 20 by the caster's thumb which permits of further movement to the left of the sleeve 25 under the influence of the spring 30, and causing the friction element 45 to exert a greater amount of friction upon the spool end 46.

It will be noted that the sleeve 25 is freely slidable to the right upon the extension 13 of the post against the tension of the spring 30.

This construction permits of what might be termed a floating or slight reciprocating movement of the sleeve and thus provides a yielding frictional engagement of the friction element 45 with the spool end 46. This yielding engagement will not be sufficient to cause binding of the parts, but it is to be understood that it will be sufficient to prevent overwinding of the reel spool.

From the foregoing, it will be apparent that the present invention provides a new and novel construction and arrangement of parts in which the several objects and advantages recited are attained, and while the invention has been herein illustrated in its preferred form, it is to be understood that it is not to be limited to the detailed construction shown since it may be carried out in other forms which fall within the scope of the appended claims.

Having thus described the invention, what I claim as new, is:

1. In a fishing reel in combination, a pair of spaced end members, a spool revolubly mounted between said end members, means for revolving said spool in one direction to wind a line thereon, the spool being normally free to revolve in the other direction to pay a line therefrom, and means for retarding the free running action of the spool, said retarding means including a post bridging the space between the end members, spool engaging means slidable along said post in a direction parallel to the axis of the spool, and means for moving said spool engaging means into and out of engagement with the spool.

2. In a fishing reel in combination, a pair of spaced end members, a spool revolubly mounted between said end members, means for revolving said spool in one direction to wind a line thereon, the spool being normally free to revolve in the other direction to pay a line therefrom, and means for retarding the free running action of the spool, said retarding means including a friction element slidably mounted upon the reel to engage and disengage the spool, means for sliding said friction element into and out of engagement with the spool, and for causing the friction element yieldingly to engage the spool when in engagement therewith, and means for adjusting the force of said yielding engagement.

3. In a fishing reel in combination, a pair of spaced end members, a spool revolubly mounted between said end members, means for revolving said spool in one direction to wind a line thereon, the spool being normally free to revolve in the other direction to pay a line therefrom, and means for retarding the free running action of the spool when paying a line therefrom, said retarding means including a post bridging the space between the spaced end members of the reel, spool engaging means slidably carried by said post, and means for moving the spool engaging means into engagement with the spool.

4. In a fishing reel in combination, a pair of spaced end members, a spool revolubly mounted between said end members, means for revolving said spool in one direction to wind a line thereon, the spool being normally free to revolve in the other direction to pay a line therefrom, and means for retarding the free running action of the spool when paying a line therefrom, said retarding means including a post bridging the space between the spaced end members of the reel, spool engaging means slidably mounted on said post, means for moving said spool engaging means into and out of engagement with the spool, and for effecting yielding engagement of the friction element with the spool.

5. In a fishing reel in combination, a pair of spaced end members, a spool revolubly mounted between said end members, means for revolving said spool in one direction to wind a line thereon, the spool being normally free to revolve in the opposite direction to pay a line therefrom, and means for retarding the free running action of the spool when paying a line therefrom, said retarding means including a post bridging the space between the end members of the reel, spool engaging means slidably mounted on the post, means for moving said spool engaging means into and out of engagement with the spool, and for effecting yielding engagement of the friction element with the spool, and means for adjusting the force of said yielding engagement.

6. In a fishing reel in combination, a pair of spaced end members, posts connecting said end members, a spool revolubly mounted between said end members, means for revolving the spool in one direction to wind a line thereon, said spool being normally free to revolve in the opposite direction to pay a line therefrom, means slidably mounted upon one of said posts for engagement with an end of the spool to retard the free revolving movement of the spool when paying a line therefrom, means revolubly mounted upon said post for moving the spool engaging means into and out of engagement with the spool, and a yielding operating connection between the spool engaging means and its operating means.

WALTER S. TORRENCE.